United States Patent [19]

Vincett et al.

[11] 4,278,335
[45] Jul. 14, 1981

[54] CAMERA WITH DEVELOPMENT AND VIEWING MEANS

[75] Inventors: Paul S. Vincett, Grand Valley; Arnold L. Pundsack, Oakville, both of Canada; Robert K. Hunter, Jr., Northridge; Wylee D. McCrary, Pasadena, both of Calif.

[73] Assignee: Xerox Corporation, Stamford, Conn.

[21] Appl. No.: 115,578

[22] Filed: Jan. 25, 1980

[51] Int. Cl.³ .................... G03B 17/50; G03B 17/55; G03B 27/32

[52] U.S. Cl. ......................... 354/3; 355/27; 355/64

[58] Field of Search ...................... 354/202 FF, 3, 83; 355/27, 64

[56] References Cited

U.S. PATENT DOCUMENTS

| | | | |
|---|---|---|---|
| 2,107,074 | 2/1938 | Hineline | 355/64 |
| 2,478,641 | 8/1949 | Rose et al. | 355/64 |
| 3,185,051 | 5/1965 | Goffe | 354/3 X |
| 3,512,882 | 5/1970 | Speers | 354/3 X |
| 3,520,681 | 7/1970 | Goffe | 354/3 X |
| 3,528,355 | 9/1970 | Blackert | 354/3 |
| 3,542,465 | 11/1970 | Pundsack et al. | 354/83 X |
| 3,821,761 | 6/1974 | Hirashima | 354/83 |
| 3,951,324 | 4/1976 | Pundsack | 226/195 |
| 4,018,525 | 4/1977 | Broderick et al. | 355/27 |
| 4,089,016 | 5/1978 | Orlando | 354/83 X |
| 4,128,322 | 12/1978 | Stemme et al. | 354/83 |
| 4,194,826 | 3/1980 | Lewis | 355/27 X |

FOREIGN PATENT DOCUMENTS

981034  1/1965  United Kingdom ............ 354/83

*Primary Examiner*—Donald A. Griffin

[57] ABSTRACT

A camera, processor and viewer is disclosed wherein the migration imaging system is utilized as the photosensitive element. The device is provided with the capability of recording an original image on the migration image film, instantly developing the image by means of heat application and also provides means for viewing the developed image immediately upon development without removal of the migration image film from the device. The device is semi-automatic in operation and is electrically powered alternatively by batteries located within the device or supplied with electrical current from an external source by means of a detachable cord.

15 Claims, 14 Drawing Figures

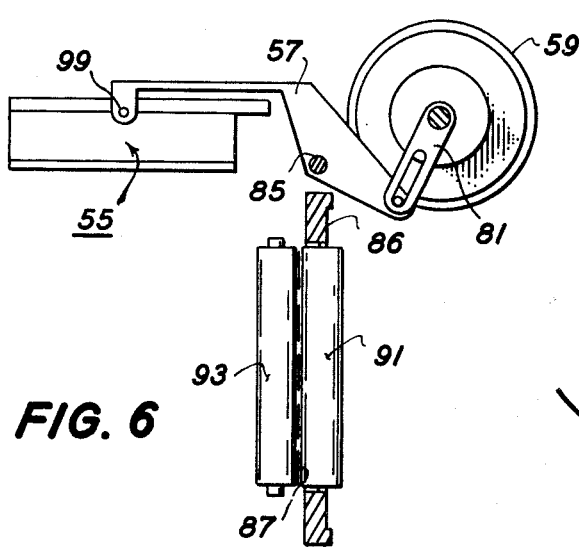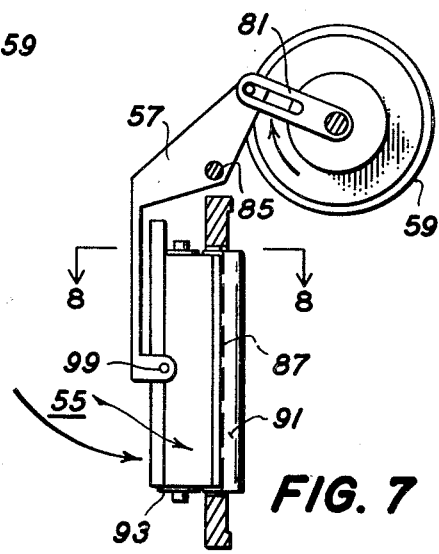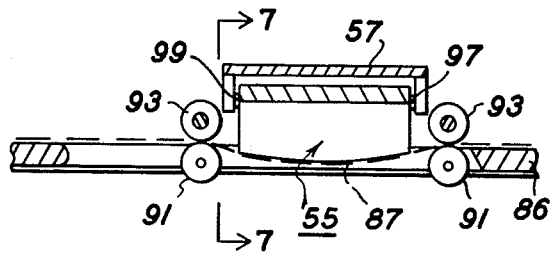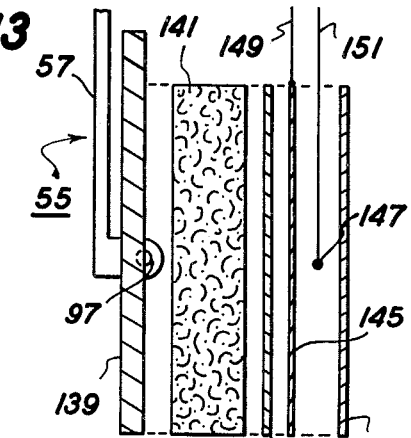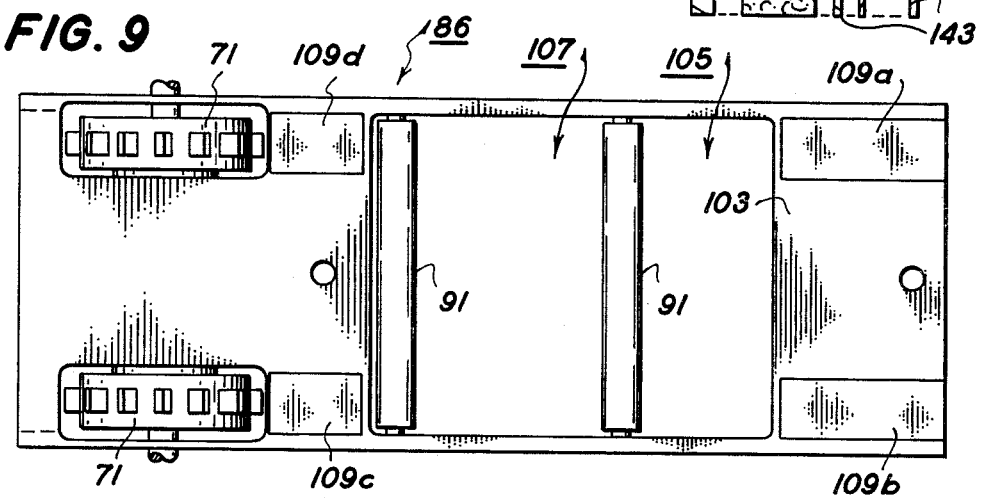

CAMERA WITH DEVELOPMENT AND VIEWING MEANS

This invention relates to a camera device and more particularly to a compact, hand-held camera having means to immediately develop and view the image captured on the film.

The novel camera of the present invention utilizes an imaging system known as the "migration" imaging system which utilizes a film comprising a conductive substrate and a layer of softenable material containing photosensitive particles overlying the conductive substrate. Camera/processors utilizing such imaging members are disclosed in U.S. Pat. Nos. 3,528,355 to Blackert; 3,524,465 to Pundsack et al.; and 3,951,324 to Pundsack. All of the devices disclosed in the abovementioned patents utilize a liquid to develop the image in accordance with the migration imaging process.

The migration imaging process itself has been known and is disclosed in U.S. Pat. No. 3,520,681. In general, the migration imaging member is uniformly electrostatically charged and then exposed to a pattern of activating electromagnetic radiation. The imaging member is then developed by exposing the member to a solvent which dissolves away the softenable layer or, by simply heating the softenable layer to reduce its resistance to migration of the photosensitive migration particles. Upon heating, the particles in the areas exposed to light proceed to migrate toward the substrate thereby creating a contrast image pattern with the non-migrated particles. Since the imaging system is capable of high resolution, micro imaging is possible and thus utilization of a transparent substrate enables the creation of micro images capable of being projected or viewed in the style of a transparency.

SUMMARY OF THE INVENTION

It is an object of this invention to provide a hand-held, high speed camera, processor, viewer utilizing migration imaging film.

It is another object of this invention to provide a portable, personal camera for use as a copying device.

Another object of this invention is to provide a device which can utilize a fully developed image within seconds after creation of the image.

Another object of this invention is to provide a camera device which utilizes a developed image while the film upon which the image is created remains in position in the camera.

Another object of this invention is to provide a camera utilizing a dry process for development of the image.

The above and other objects are accomplished by providing a camera, processor, viewer which rapidly exposes, develops and projects an image created by means of a migration imaging process. In one embodiment, the camera is completely self contained utilizing dry storage batteries to provide power for all of the systems required to perform the functions of the camera.

BRIEF DESCRIPTION OF THE DRAWINGS

FIG. 6 is a side view, in partial section, of the heat development apparatus of this invention.

FIG. 7 is a side view, in partial section, of the heat development apparatus in operation position.

FIG. 8 is a sectional view of FIG. 7 along lines 8, 8.

FIG. 9 is a plane view of the aperture plate in the film cassette utilized in the camera device.

FIG. 13 is an exploded view of the heat development platen.

DETAILED DESCRIPTION OF THE DRAWINGS

Figure 1:
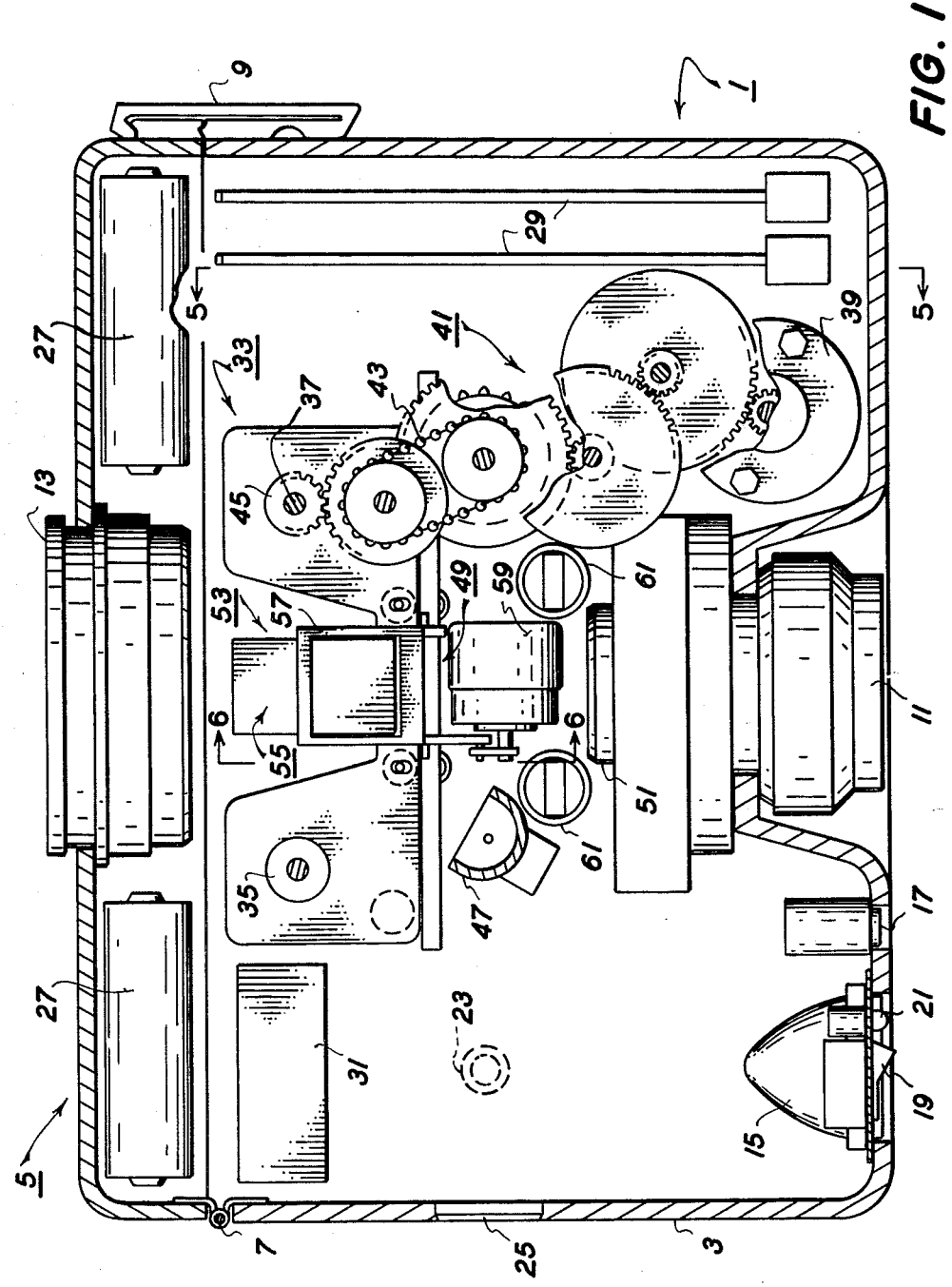
FIG. 1 is a sectional view of the device of this invention.

In FIG. 1, there is shown, in partial section, the camera, processor, viewer. Camera 1 comprises a light-tight case 3 having a hinged back cover 5 suspended from hinge 7 and held in closed position by clasp 9. Interior access is normally desired for obvious purposes of film replacement and maintenance. Case 3 also has mounted thereon photographic lens 11 typically operated at approximately f/8 through which imagewise exposure occurs to provide a focused image on an image plane within the camera. On the hinged back cover, viewing lens 13 provides means to view the image subsequent to development thereby allowing the user to immediately inspect the image captured on the sensitive film to determine its adequacy. Viewing lens 13 can also be utilized as a projection lens whereby the image on the film can be projected out of the camera for various purposes such as producing hard copy through a xerographic copying device, etc., as will be more fully described below. In one exemplary mode of operation, a Fresnel lens is placed upon the document platen if the copying machine employs a document scanning system. Alternatively, the image may be projected through photographic lens 11 depending upon the intended utilization of the projected image. Viewing lens 13 is usually kept covered by a lens cap so as to prevent pre-exposure of the migration imaging film. Any suitable aperture means can be included which is actuated when image viewing or projection is desired, but the most economical expedient is to simply cover the lens when not in use.

Also included on case 3, is flash lamp 15 and electronic flash control light detector 17 well known in the photographic art with respect to construction, function and operation. A typical flash unit is a Rollei 128BC electronic flash unit available from Rollei of America, Fairfield, N.J. Also included on case 3 is power switch 19 and light emitting diode (LED) indicator lights 21 also well known in the art of photography and which will be more fully described below.

Case 3 also is provided with aperture 23 through which a power cable attached to an external power supply is fitted so as to power the device at the option of the user. Mounting device 25 is provided on case 3 whereby the camera may be mounted on a stand for either photographing or projecting an image. Such attachment to a stand is well known in the art.

Within case 3, there is shown in FIG. 1, dry cell batteries 27 which are electrically connected in series to power control circuit boards 29. Circuit boards 29 supply electrical power to operate the functions required in operation. Batteries 27 are, for example, AA size 1.2 V, 500 mA.-hr., rechargeable nickel-cadmium units. Typical batteries are available commercially as Eveready Brand, Model CF15T from the Union Carbide Corporation, New York, N.Y. Control circuits for the various operations of the camera device of this invention are contained within printed circuit boards 29 which are arranged so as to provide a semi-automatic program for the various steps and functions required to complete the imaging process, development and viewing of the developed image within the camera. The high voltage requirements for operation of electrostatic charging means are provided by power supply 31. A typical suitable high voltage power supply is Model XV420 available commercially from Mil Electronics Inc., Lowell, Ma.

The migration imaging member utilized in the device is supplied in the form of a cassette 33 containing a feed roll 35 and takeup roll 37. The film is caused to advance within the cassette by means of a motor driven drive train represented in FIG. 1 beginning with electric motor 39 through a gear reduction series generally shown as 41 including chain drive 43 to driven gear 45.

As is well known in the migration imaging art, the migration imaging film is not sensitive to light until electrostatically charged which feature of the imaging process enables the device to become at once a camera and an image projector. Accordingly, stationary charging means 47 is provided to charge the film in cassette 33 as the film is brought from supply roll 35 toward takeup roll 37. In the present embodiment, charging means 47 is a corotron, preferably negatively charging, although other suitable charging means can be employed as is well known in the art, as for example, charging rollers. When properly programmed, sufficient film is brought past corotron 47 so as to fill imaging station 49 with uniformly electrostatically charged film. Light is admitted to imaging station 49 in the correct proportion by means of aperture means 51 which contains a shutter. Means 51 is of conventional structure well known in the photographic art. In another embodiment, charging means 47 is moved in operative relationship to the imaging member which remains stationary. The charging means 47 can be supplied with a constant current although a constant voltage supply can also be employed.

Subsequent to exposure of the film at imaging station 49, development means generally shown as means 53 is activated whereby a heated platen 55 supported on arm 57 is moved in an arcuate path into imaging station 49 to contact the substrate side of the migration imaging member by drive motor 59 as will be more fully described below. In accordance with a preset program of operation, the control circuit from circuit boards 29 positions heated platen 55 into contact with the migration imaging film substrate and allows it to remain for a period of time sufficient to soften the softenable material and to allow migration of the migration material through the softenable material toward the substrate. At the end of the programmed contact time between the platen and the film substrate, drive motor 59 lifts platen 55 away from the film substrate returning the platen to its stored position as shown in FIG. 1. Alternative development means include heated devices such as heated rollers as shown in U.S. Pat. No. 3,719,951 to Kingsley et al.

The developed image located at imaging station 49 can now be viewed through viewing lens 13 and for this purpose lamps 61 are activated thus illuminating the developed image for purposes of either viewing or projection through lens 13. One is reminded that the migration imaging member is not sensitive to the light unless electrostatically charged. Thus, by charging and processing only one frame of the migration imaging member through to development of the image there is no harm done to the stored migration imaging film by activation of lamps 61 within the camera. Of course, viewing of the image is optional to the user and may be eliminated in the sequence of operation.

In an alternative mode of operation, one may sequentially sensitize and expose segments of migration imaging film contained in cassette 33 and optionally fail to develop the latent image and pass the latent image into takeup spool 37 for later development under safe light conditions outside of the camera.

In an alternative embodiment, the undeveloped film is passed on to takeup spool 37 and can be returned to imaging station 49 by the addition of an auxiliary positive drive source connected to feel roll 35 and reversal of the direction of motor 39. The image can then be developed and viewed as desired. In yet another embodiment, development means 53 can be located anywhere in the path of travel of the migration imaging film whereby the film is developed at a different location than exposed. Likewise, preferably by the utilization of a reversable motor 39 and positive drive on feed roll 35 and takeup spool 37, viewing lens 13 and lamps 61 can be located at any appropriate location in case 3 so as to view the image on the film at any convenient point along its path of travel. In addition, a light diffusing screen is desirably placed between lamps 61 and the image bearing migration imaging member. Should one utilize imaging station 49 as the viewing station also, a retractable diffusing screen and light source can be utilized to illuminate the image when desired. In such instance, the light source and diffusing screen is stored out of its operating position during the exposure step of the imaging process.

Figure 2:
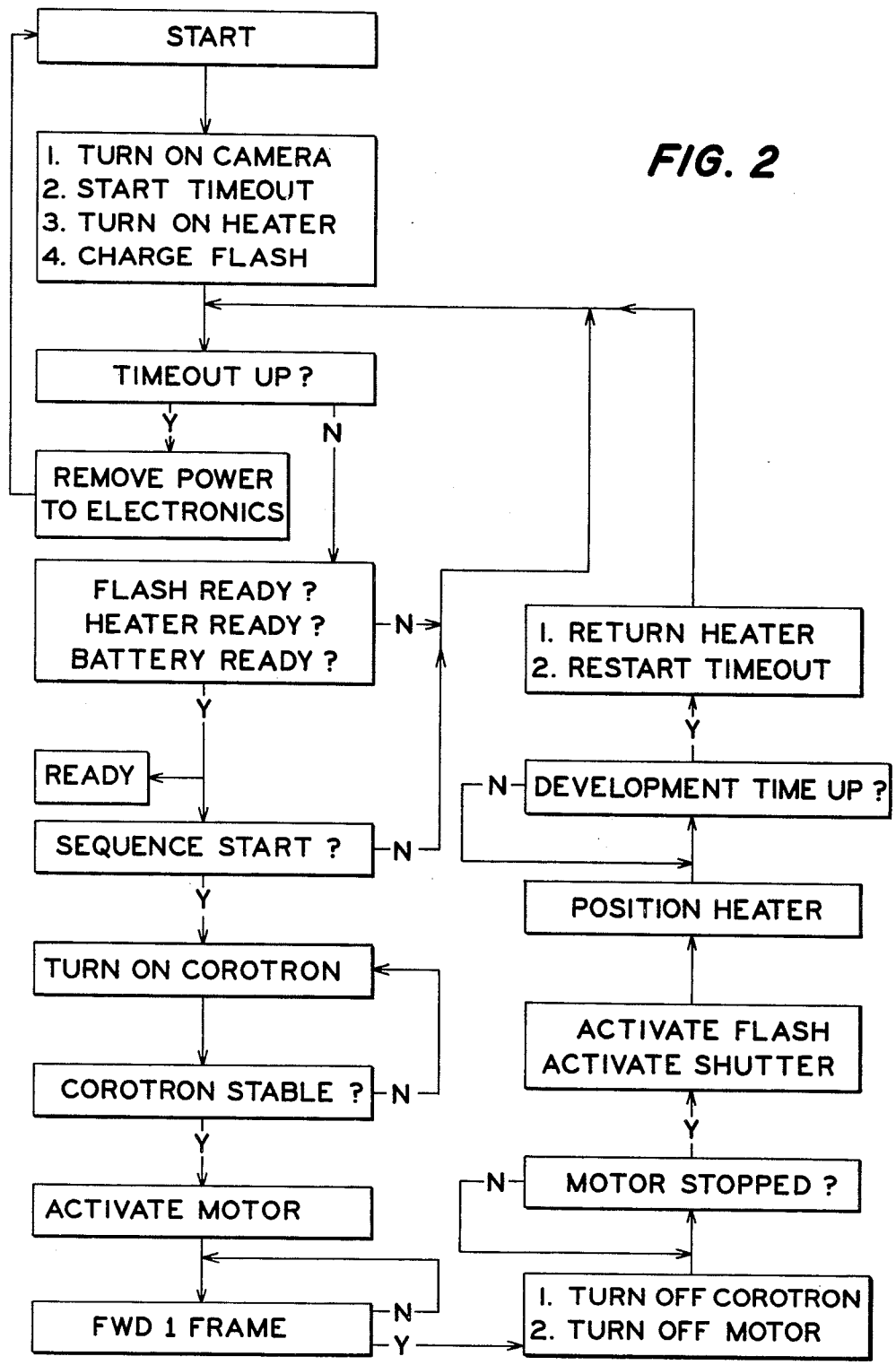
FIG. 2 is a logic flow sheet of the device of this invention.
Figure 4:
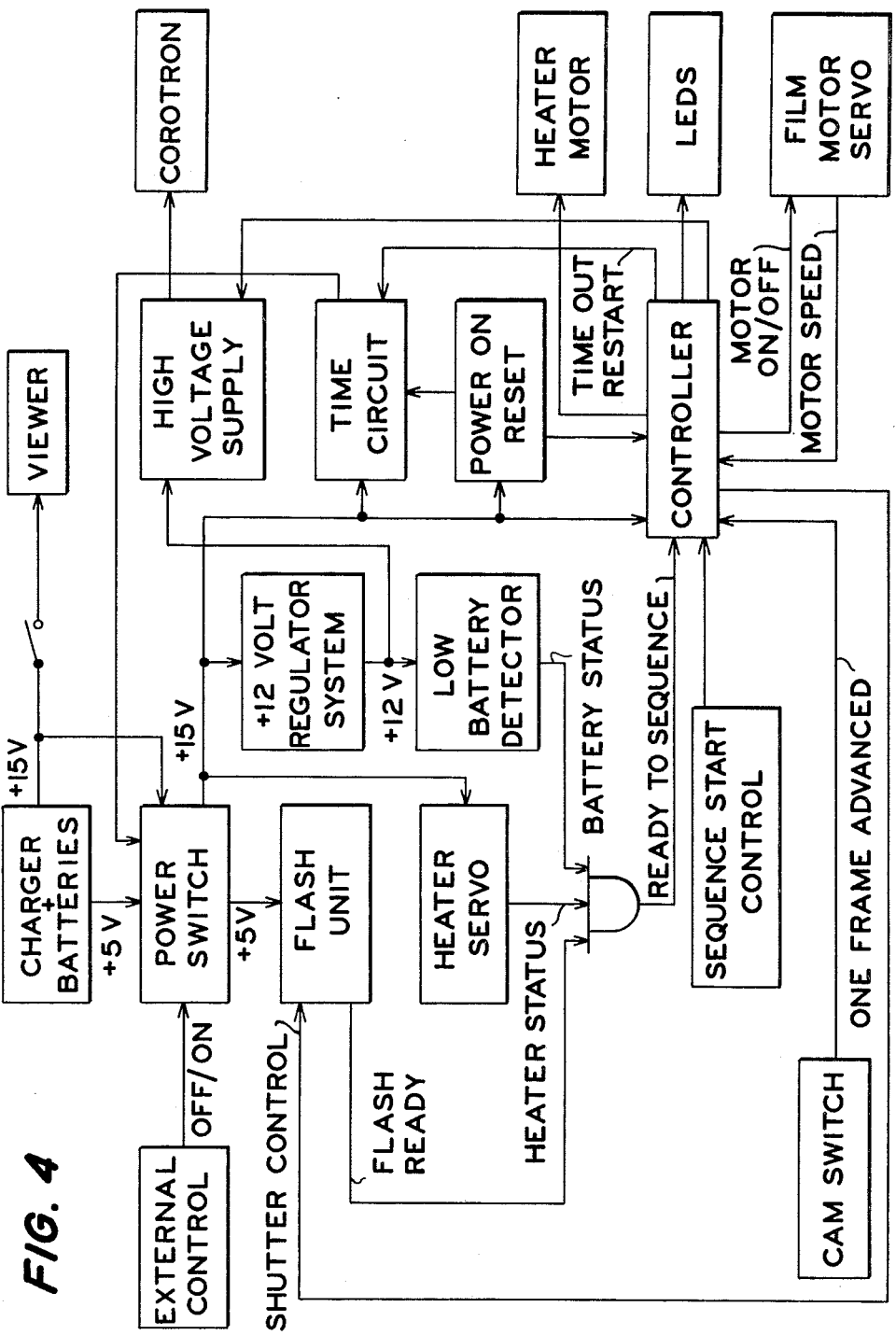
FIG. 4 is a block diagram flow chart of the logic circuit of the device of this invention.

The above-mentioned procedures to produce an image described with respect to FIG. 1 are carried out semi-automatically by means of an electronic logic system. The logic flow chart is shown in FIG. 2 while a typical block diagram for printed circuit boards 29 are shown in FIG. 4.

The process is initiated by toggle switch 19 of FIG. 1 to supply the electrical current to the components utilized to produce an image in the migration imaging member. When the unit is switched on, the power is immediately supplied to platen 55 to raise the platen to development temperature. Also, the flash charging unit is activated in the manner of a standard feature in photographic art. The LED indicator lights on the exterior of case 3 respond to indicate the readiness of the camera. A red LED indicates that the camera is not ready for operation and the logic circuitry eliminates the possibility of improper exposure by failing to connect the power to the operating components of the camera until the platen is heated to development temperature and the flash unit is fully charged. In addition, a circuit is employed to monitor the charge level of the batteries when the platen 55 has been heated to operating temperature. Should the charge level of the batteries be inadequate at that time, the electrical power is not connected to the operating components thereby preventing further operation of the imaging sequence. There is also provided a timing circuit in the logic circuitry which is activated when the unit is turned on. If no exposure occurs within a set period of time, such as one minute after activation, the timer disconnects power to the camera and returns the condition of the camera to the start position as shown by the yes route in FIG. 2.

The automatic sequence begins with the activation of corotron 47. The sequence is initiated by the operator of the device, typically by depressing an external control switch or button. A sensing circuit determines whether the corotron is operating properly, and if not, the system becomes cyclic in the attempt to activate the corotron before permitting further operation. In the event the sensing circuit determines that the corotron is stabilized, the drive motor 39 is activated immediately to forward the film the distance required to fill the imaging station 49 with uniformly electrostatically charged film. Again, the sensing circuit cyclically determines the movement of the film and continues to activate the motor until the sensing circuit detects the movement of sufficient film. Upon completion of movement of the film, the control circuit turns off the corotron and the motor and then activates the shutter and flash mechanism.

Subsequent to activation of the shutter and flash circuits, the platen 55 is placed into development position in contact with the film substrate by activation of motor 59 as described above. At a preset time, the heated platen 55 is removed from the substrate of the film and the circuit returned to the timing cycle for initiation of a subsequent exposure. Should a subsequent exposure not occur within the time set by the circuit, the power to all circuits would terminate and the camera returned to the start condition. Also included in this embodiment is a cyclic sensing circuit to determine the removal of the heated platen 55 thus terminating development which cyclic circuit actuates the mechanism for removal of the heated platen from the film substrate.

A major concern with a hand-held unit, completely powered by dry cell batteries located within the unit is the conservation of power. The circuitry, more fully explained below, thus provides maximum efficiency with respect to the expenditure of power from the voltage source, either external or internal. Logic systems are provided such that the electrostatic charging step, requiring an accurately stabilized power supply, is not operated until heated platen 55 is at substantially operating temperature.

Figure 3:
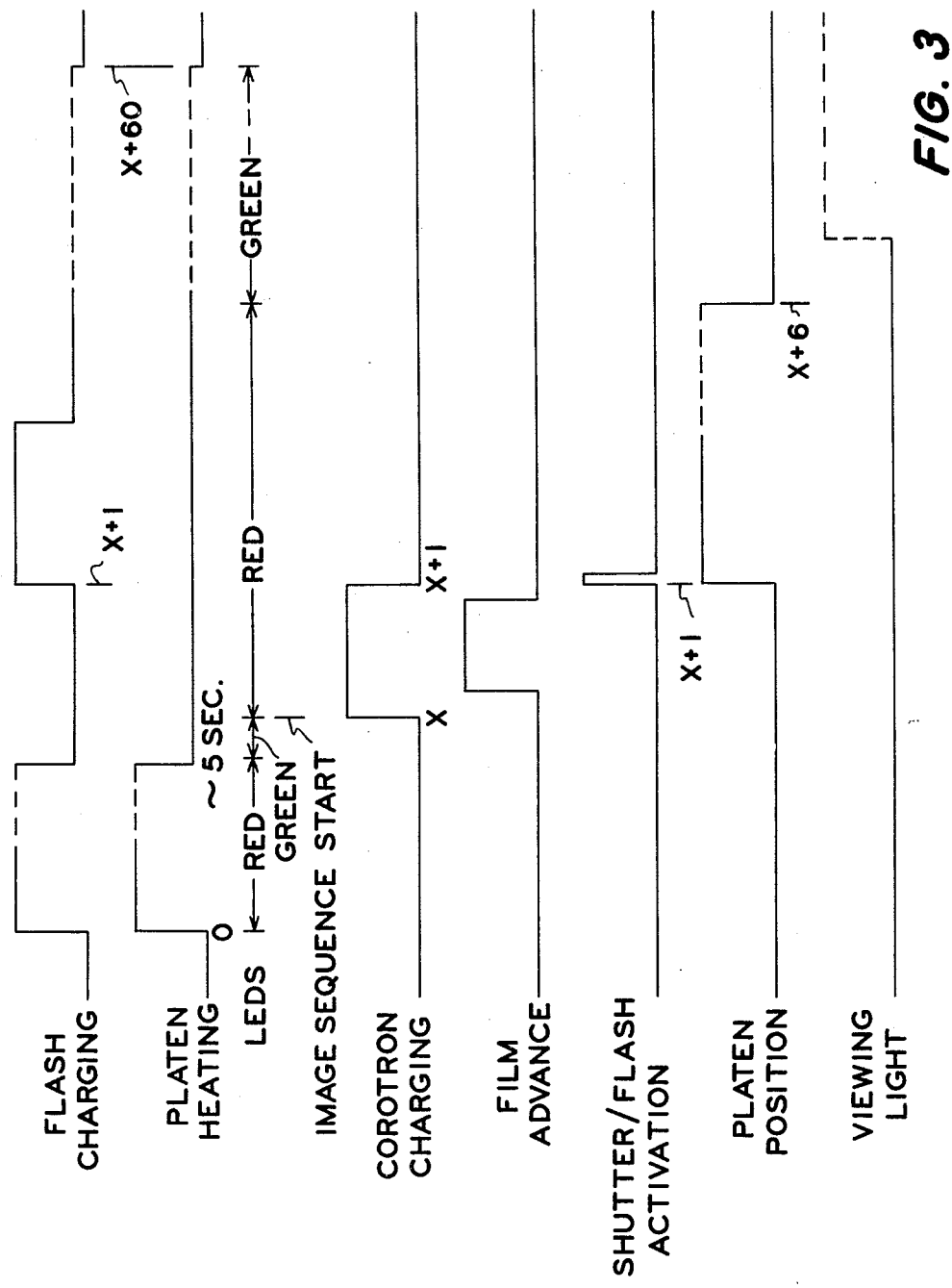
FIG. 3 is a time sequence bar graph of the electrically operated elements of the device of this invention.

To provide a clear understanding of the timing cycle of voltage application, there is shown in FIG. 3 a time/sequence chart of the system operation. In FIG. 3, the line even with the camera unit designation indicates no power being supplied to the unit while the elevated line indicates that power is being supplied. The first unit specified in FIG. 3 is the flash charging unit which charges the standard photographic flash unit continuously from the time the system is actuated by turning on the power switch to the time the switch is turned off. As indicated in FIG. 3, the electrical current is reduced when the unit is sufficiently charged and then increased subsequent to operation to quickly recharge the unit.

The power which raises the temperature of platen 55 to development temperature is a major power drain in the system. The most power is consumed during the initial heating of the platen and, as indicated in FIG. 3, the power to the platen is supplied upon initiation of the system by operation of power switch 19. Although a major power drain occurs initially, the power requirements subside as the platen 55 reaches development temperature and a small amount of power is then required to maintain such temperature.

When (1) platen 55 reaches the proper temperature, (2) the flash unit is properly charged, and (3) the battery charge level is adequate, the red LED lamp is extinguished and the green LED lamp illuminated to indicate to the operator that the imaging sequence can be initiated. If no imaging sequench is initiated within a preset time, for example, 60 seconds, the electrical power to imaging process components is interrupted requiring a restart procedure. While the green LED is illuminated, the operator can proceed to utilize the device to record images by manually actuating a switch which initiates the imaging process sequence.

Immediately following the film advance, the shutter/flash mechanism is actuated to expose the migration imaging film to imagewise radiation. The shutter/flash exposure mechanism is most advantageously activated immediately following the termination of the film advance since the electrostatic charge residing on the surface of the film is at the maximum at this time. Obviously, a long delay subsequent to film advance and charging will result in reduced voltage being maintained across the migration imaging member due to leakage which is well known in the migration imaging art. Immediately upon termination of the exposure, power is supplied to motor 59 which drives heated platen 55 into position against the substrate of the migration imaging film. The platen 55 is held in position for approximately 5 seconds to allow heating of the softenable layer and is then withdrawn by reverse action of platen drive motor 59.

Although shown in FIG. 3, immediately following the development of the image, illumination of the viewing lamps can take place at any time subsequent to development of the film and the return of platen 55 to its stored position as shown in FIG. 1.

In the above sequence of operation, the timing circuit to remove the electrical power from the camera and return it to the start condition is usually set for a period of about one minute. The time required to bring the camera from the start condition to the ready condition is usually about 5 seconds. The circuit actuates a red LED for the period prior to being ready and then automatically extinguishes the red LED and powers a green LED display indicating the camera is ready for operation. At the time the shutter control mechanism is activated, the red LED lamp is again illuminated and the green light terminated until the entire automatic sequence for image creation takes place. During this sequence, no further exposure of the film can be initiated. At present, this sequence consumes about 5 seconds after which the green LED display once more indicates that another exposure can be initiated. Thus, a total time from start to finished image viewable by illumination of lamps 61 is approximately 10 seconds while subsequent imaging after the first image without returning the camera to the start condition can be accomplished in approximately 5 second intervals.

A typical block diagram is shown in FIG. 4. While there are numerous choices for a logic circuit to control the operations described above, FIG. 4 represents a typical control circuit which can comprise printed circuit boards 29 of FIG. 1.

There is shown in FIG. 4 the operating pattern for the device of this invention. Logic circuitry to perform the functions set forth in FIG. 4 is easily assembled from commercially available components.

Figure 5:
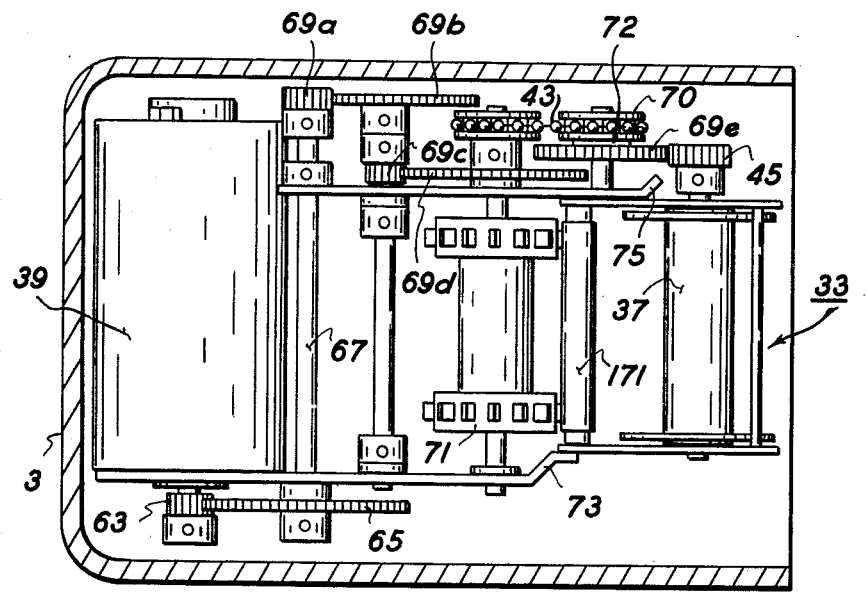
FIG. 5 is a sectional view of the film drive mechanism.

To further illustrate the relationship of the film drive train and the film cassette, there is shown in FIG. 5 the section indicated in FIG. 1. In FIG. 5 there is shown case 3 containing drive motor 39 with drive gear 63 attached to motor 39 and driven gear 65 on shaft 67. Gear reductions to slow the speed of the film to the desired level is achieved through gear reduction ratios of gears 69a-e. Between gear 69d and 69e, there is inserted timing chain drive 43. Gear 69e is driven by a friction coupling 72 below chain sprocket 70 to protect the film.

In FIG. 5, sprocket spool 71 engages the migration imaging film through perforations in the film. Rotation of sprocket 71 provides movement of the film and is also a grounding means whereby the conductive layer of the migration imaging film is grounded during the charging step by corotron 47, mentioned above. Grounding the imaging member in this manner is shown in U.S. Pat. No. 3,910,475 to Pundsack et al. The rotation of sprocket wheel 71 controls the distance of movement of the migration imaging film. Driven gear 69e drives gear 45 attached to the takeup spool 37 to provide constant torque thereon.

Cassette 33 resides in place during operation by inserting the cassette frame between a rigid frame member 73 and a flexible frame member 75. Flexible frame member 75 exerts pressure on cassette 33 holding it in place during operation and allowing easy removal of the cassette when desired.

FIG. 6 illustrates the mechanism whereby platen 55 is moved into and out of operative relationship with the migration imaging film. In FIG. 6, there is shown drive motor 59 which rotates crank arm 81 in camming relationship with platen support arm 57. Arm 57 pivots around axle 85 as crank arm 81 cams support arm 57 during rotation. As shown in FIG. 6, platen 55 is held above the film cassette at imaging station 49 shown in FIG. 1. In FIG. 6, the aperture plate 86 is shown in section with migration imaging film 87 adjacent thereto.

In FIG. 7, platen 55 is shown in operative relationship to film 87 having been pivoted about axle 85 by the rotation of crank arm 81. Platen 55 contacts the substrate of film 87 at the imaging aperture of aperture plate 86 thus creating a slight indentation of the film into the aperture of aperture plate 86 to assure uniform contact between platen 55 and film 87 throughout the image area.

FIG. 8 is another view of platen 55 in operative relationship with film 87 along the line 8, 8 of FIG. 7. As indicated above, platen 55 presses film 87 into the aperture of aperture plate 86. To further assure uniform contact between film 87 and platen 55 during the development step, the surface of platen 55 which contacts the substrate of film 87 is arcuate in one direction. The arcuate shape of platen 55 has been provided to assure uniform contact of the film throughout the imaging area.

Also shown in FIG. 8 are electrically insulated rollers 91 attached to aperture plate 86 which form guide posts for film 87 and support film 87 during contact by platen 55. Spring loaded rollers 93 cooperate with rollers 91 to hold the edges of the exposed areas of film 87 in the focal plane. To further contribute to uniform contact between platen 55 and the substrate of film 87, platen 55 is allowed to pivot about axles 97 and 99 mounted on support arm 57.

The film is also held taut by the drag applied to the film supply and takeup spools in the film cassette. Appropriate means to apply such drag is, for example, provided by foam washers between the ends of the cassette spools and the sides of the cassette frame.

In operation, the voltage across the thermistor from an applied current is compared with a precision reference voltage and, using a proportional control circuit, an appropriate voltage is applied to the heater to raise its temperature in the range of about 120° C. and to maintain the temperature within about $\pm \frac{1}{2}°$ C. As mentioned above, the majority of the energy utilized by the heater is to raise its temperature to the required value with little cooling experienced in the surface portion of the heater since it is isolated from the camera frame. The thermistor output is monitored by an auxiliary circuit which is capable of discontinuing the voltage to the heater in the event the thermistor fails to operate.

After contact of about 5 seconds by platen 55 to the substrate of film 87, the platen is returned to its original position as indicated in FIG. 6 by the reverse operation of drive motor 59. After development of the film, the image recorded thereon can be viewed immediately by actuation of lamps 61 by suitable switching means located on the exterior of case 3. A lens cap covering viewing lens 13 is removed to reveal the image. The image appears at about a 4× reduction from the original. The lamps are placed adjacent the field of view. The migrated particles in the film provide sufficient light scattering to produce a readable image without the need of a diffusing screen. As indicated in FIG. 1, lamps 61 are located on the opposite side of the film from viewing lens 13. A virtual image system is provided by lens 13. Should the camera be operated by exterior power supply rather than a battery driven power supply, and thus permitting brighter illumination, the image could be projected onto a ground glass screen or one could project the image through the camera lens to a document plane for purposes of viewing. For this mode of operation, an additional light source is placed alternatively near the exterior of the viewing lens 13 or within case 3 on hinged cover 5.

In FIG. 9, there is shown aperture plate 86 against which is placed the migration imaging film utilized in the device of this invention. Aperture plate 86 comprises plate 103 which carries rollers 91 in the aperture thereby dividing the aperture into two separate areas, 105 and 107. Sprocket spool 71 protrudes through two openings in plate 103 so as to contact the perforations of the migration imaging film driving it toward takeup roll 37, not shown in FIG. 9. Plate 103 is also equipped with electrically insulating pads 109a-d. These electrically insulating pads prevent abrasive contact of the film with the surface of plate 103 and electrical discharge of the film. While any suitable insulating material can be utilized, Teflon, a tetrafluoroethylene polymer commercially available from the E. I. duPont de Nemours & Co., has been found to be preferred because of its high dielectric strength , lubricating property and smoothness.

As the migration imaging film proceeds across the aperture plate, it first passes aperture area 105 to receive an electrostatic charge from corona discharge device 47. In the automatic mode of operation, the film immediately proceeds to area 107 which is positioned at imaging station 49 of the device and where the film is exposed to a light image through lens system 11 and developed. After development and, if desired, viewing, the migration imaging film proceeds in stepwise motion towards the takeup spool as each successive portion of film is utilized.

Figure 10:
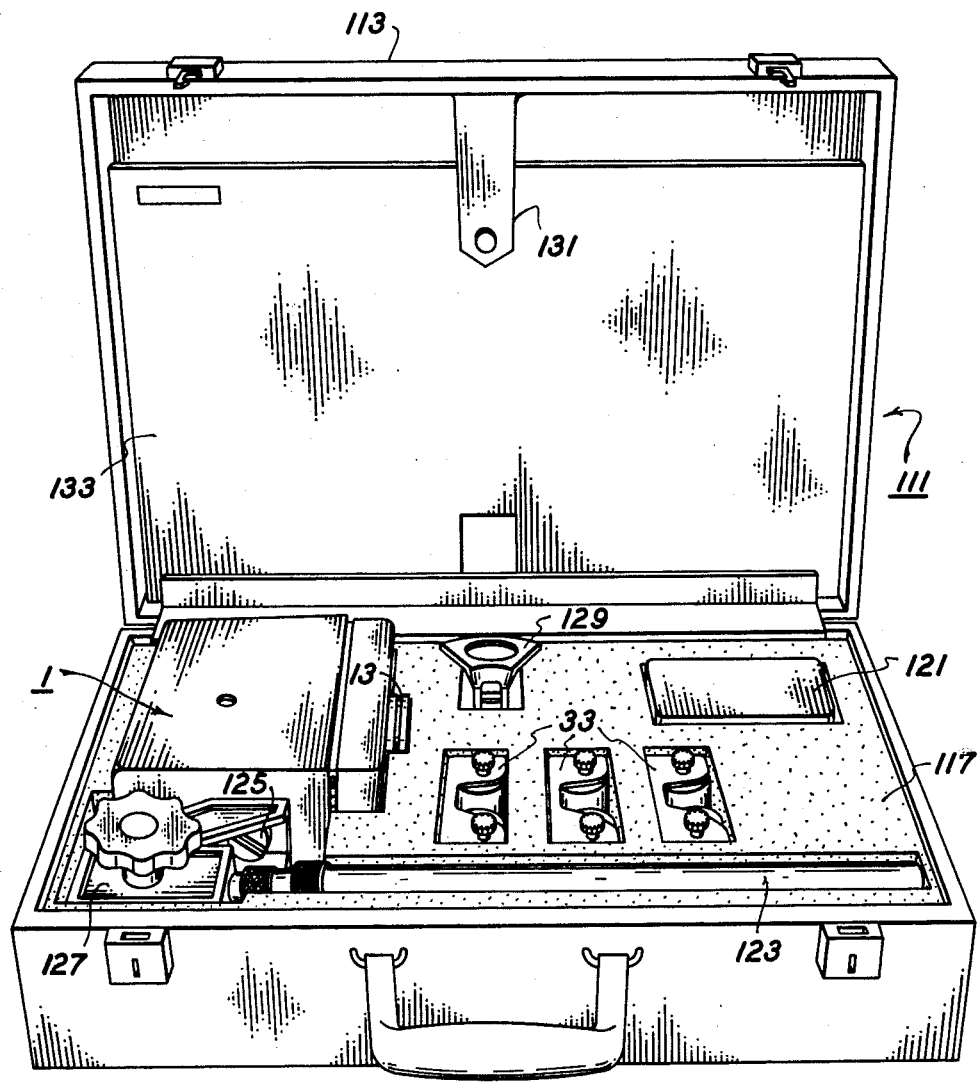
FIG. 10 is a perspective view of one embodiment of the device of this invention.

To illustrate one embodiment of the device of this invention, there is shown in FIG. 10 carrying case 111 including a hinged cover 113. Camera device 1 is shown resting in a formed resilient storage medium 117 along with extra film cassettes 33. If desired. extra film can also be carried in case 111 as is indicated by package 121. To provide accurate focusing, a support stand 123 is provided which can remain attached to camera 1 by mounting screw 125. Various positions are achieved by mounting bracket 127 at the end of support stand 123 so as to direct the camera in alternative directions. Support stand 123 is fitted into bracket 129 during operation and, as is shown in FIG. 10, is telescopic so as to provide variable height adjustment. Bracket 129 is firmly attached to carrying case 111 and holds support stand 123.

Stored in lid 113 behind clasp 131 is document support means 133. In operation, document support means 133 is removed from the lid and placed over the resilient storage material 117 to form a document platen as will be more fully described below.

Figure 11:
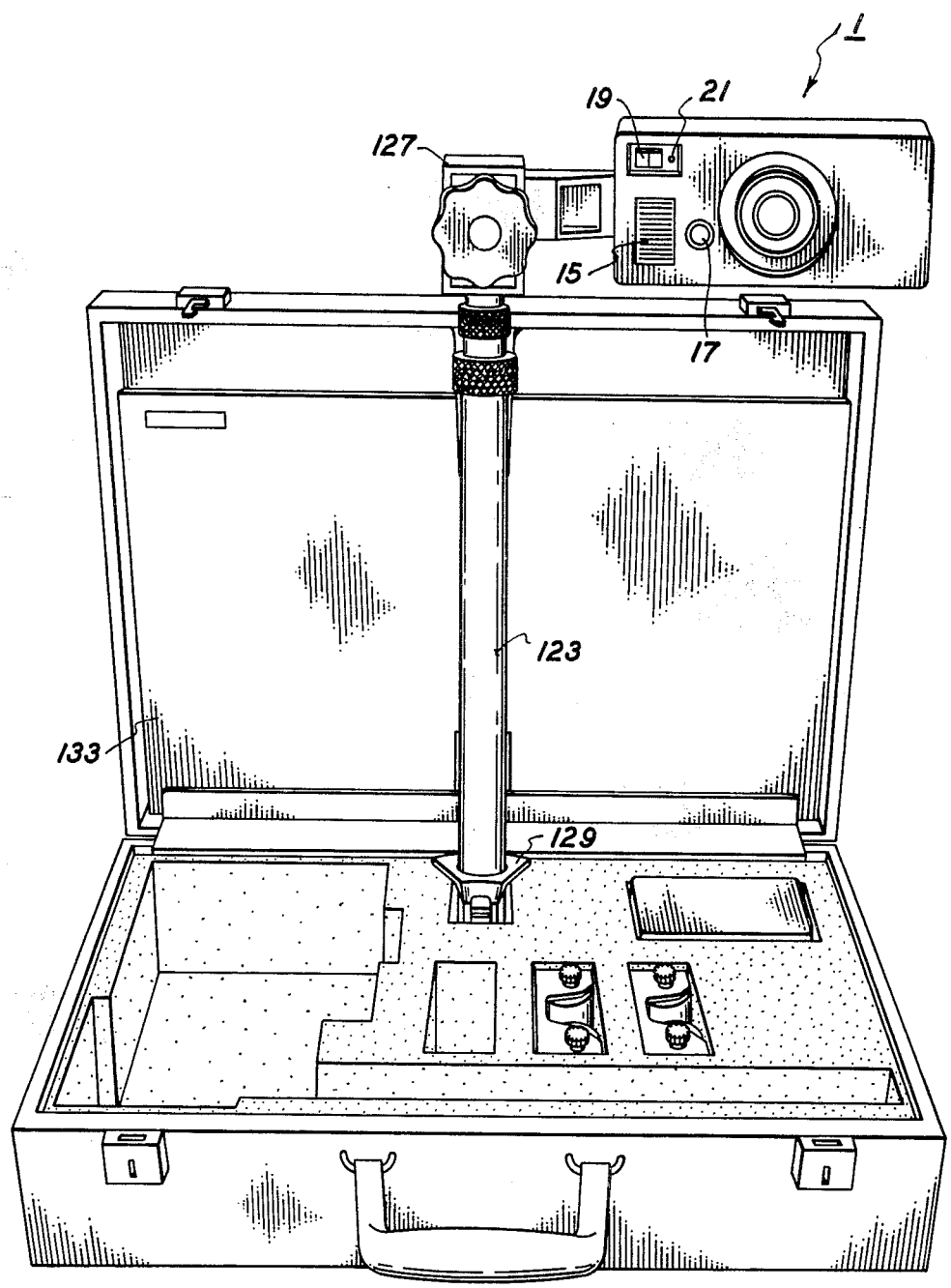
FIG. 11 is a perspective view of the embodiment of FIG. 10 in one operative position.

In FIG. 11, there is shown camera 1 in operative position supported by stand 123. In this exemplary illustration, the camera is directed toward an object such as a blackboard or other vertically supported image which can be focused by the lens system of camera 1 upon the migration imaging member within the camera. Also shown on the face of camera 1 is LED display lights 21, flash unit 15, flash control 17 and power switch 19.

Mounting bracket 127 mounted on support stand 123 holds camera 1 in any direction encompassing a full 360° rotation about support 123. While mounting bracket 127 holds camera 1 rigid in any set position, the direction of the camera can be made by simple rotation of support stand 123 while residing in bracket 129.

Figure 12:
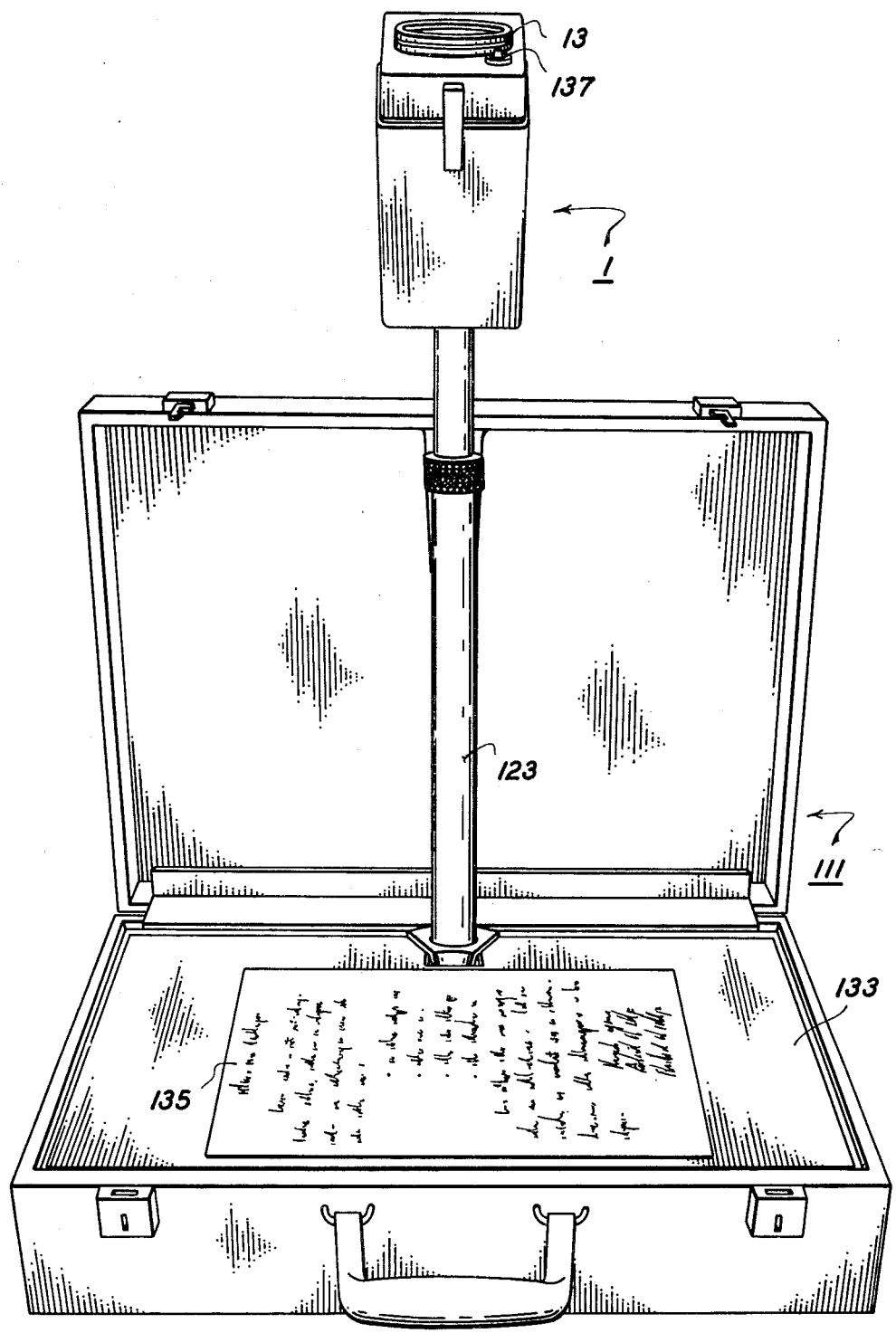
FIG. 12 is a perspective view of the embodiment of FIG. 10 in another operative position.

In FIG. 12, camera 1 is shown in another embodiment wherein document support means 133 is placed over resilient storage material 117 to form a document platen upon which is placed a document 135. The camera lens is appropriately focused and the document recorded on the migration imaging member within camera 1 by the mechanism described above. In this embodiment, it is clear that a user of the device of this invention can conveniently transport the camera, film, extra cassettes and support stand in the carrying case 111 to any desired location such as a library or office and conveniently copy the desired documents in various modes as described herein.

One unique advantage of the apparatus of this invention is the capability of inspecting the image recorded on the film within the camera. In FIG. 12, there is shown viewing lens 13 through which one may observe the developed image residing in the camera at imaging station 49 as shown in FIG. 1. Lamps contained within the body of camera 1 can be activated by switch 137 on the body of camera 1. In the embodiment of FIG. 12, camera 1 is directed downward by rotation around mounting screw 125 shown in FIG. 10. Accordingly, by rotation of support stand 123, combined with rotation of the camera 1 about mounting screw 125, the camera can be aimed at any desired direction.

As mentioned above, the problem of supplying sufficient energy to an electrically driven camera device utilizing the application of heat for the purpose of developing an image in the migration imaging process has been fundamental. In one embodiment of the apparatus of this inventin, this problem has been overcome by the construction of a particularly unique heated platen 55. Aside from its geometric configuration as described in FIG. 8 above, a low heat capacity device was required in order to keep energy requirements at a minimum while, at the same time, providing a quickly heated surface which can instantly develop the migration imaging film. In FIG. 13, there is shown an exploded view of heated platen 55. In FIG. 13, platen 55 is shown with a portion of support arm 57 fastened to a backing plate 139. Backing plate 139 provides rigidity and structural support for the other elements of platen 55. Adhered to backing plate 139, such as by adhesive, is thermally insulating pade 141. Pad 141 can comprise any suitable thermally insulating material and is preferably a polyurethane foam material having a thickness of about 6 mm.

On the surface of pad 141, there is adhered a series of elements which comprise the actual heated portion of platen 55. The heated portion comprises aluminum plates 143 which sandwich a thin resistor heater 145 and heat sensing device 147. Typically, aluminum sheets 143 have a thickness of about 0.4 mm. each while resistive heater 145 can comprise a thin foil such as a 5.7 ohm foil heater commercially available from Minco Products, Inc., Minneapolis, Minn. A small thermistor 147 is electrically insulated with any suitable insulating material such as a varnish adhesive and is utilized to sense the temperature of the aluminum plates. Likewise, the resistive heating means 145 is also electrically insulated such as with a varnish coating. Thus, by utilizing thin plates, one provides a rapidly heated surface which is on a thermally insulated support so that it will not quickly lose stored heat but does not require too large an amount of energy to bring to development temperature. Leads 149 and 151 connect the heater and sensing device to their respective electrical circuit. A typical thermistor is a Model A1B10KA502N.5NC commercially available from Thermometrics, Inc. Edison, N.J.

Figure 14:
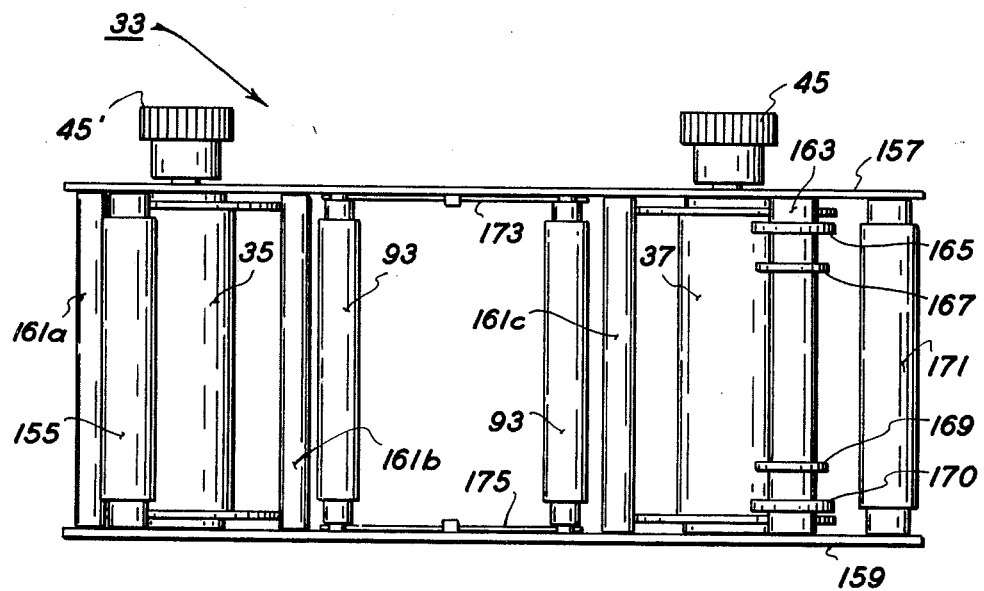
FIG. 14 is a front elevation of the film cassette.

In FIG. 14, there is shown a front elevation of the film cassette 33 which holds the migration imaging film in the camera device of this invention. In this exemplary illustration, the cassette 33 holds the film supply at supply spool 35 from which the film is pulled to takeup spool 37 by force supplied through sprocket 71. Should one desire to drive the film in the opposite direction, gear 45' is then driven by an appropriate gear train as in gear 45. Cassette 33 comprises plates 157 and 159 held together by support rods 161a, 161b, and 161c. A further support rod is hidden behind ribbed roller 163. The film is supported by ribs 165, 167, 169 and 170 during contact with sprocket 71 of FIG. 5.

The path of travel of the film is determined by the configuration of the cassette. In FIG. 14, the film is removed from supply roll 35 and directed around rollers 155, 93, ribbed roller 163, and roller 171. From roller 171, the film is directed to takeup spool 37. As mentioned above, rollers 93 are spring loaded. In FIG. 14, wire springs 173 and 175 provide the tension on rollers 93 forcing them forward. As the cassette is seated in the camera, rollers 93 apply a slight force to the film opposite rollers 91 of the aperture plate 86 shown in FIG. 9. By sandwiching the film between rollers 91 and 93, there is provided a film support for contact by platen 55 during image development.

Alternatively, the film can be supplied in the camera of this invention in any convenient form such as a manually actuated slide, a fiche holder, or the camera may be provided with a takeup spool while fresh film is supplied from an entirely separate spool unassociated with a cassette. The path of travel of the film can therefore be altered by modifying the manner in which the film is supplied or by varying the shape of the cassette.

There is thus disclosed a portable camera, processor and viewer device utilizing a light sensitive film of such quality that images greatly reduced in size can be recorded at practically any location. A typical camera device in accordance with this invention can be contained within a case having the dimensions of approximately 18×15×8.5 cm. Such a unit will weigh about 2 Kg. Typically, about 100 images can be made before battery recharging is required. While the device has been described with respect to one embodiment, other alternative eqivalent embodiments are intended to be embraced by the present invention. For example, if one desires a use-once-only device, hinge 7 may be deleted since the film can be installed during construction of the camera. In such instance, hinged back cover 5 is integral with light-tight case 3 providing an exceptionally durable, water, gas and light-tight case accessible only by destruction or with specially made implements.

What is claimed is:

1. A camera comprising in combination:
(a) a light-tight case;
(b) a lens and aperture means in said case to admit a controlled amount of light focussed on an image plane within said case;
(c) means to forward and hold a supply of migration imaging film along a path in said image plane;
(d) means to electrostatically charge said film surface supplied to said image plane;
(e) means to develop a latent image in said film by application of heat to said film, said means including a supporting substrate mounted on a support arm, a thermally insulating layer on said substrate, and an electrically heated arcuate heated surface on said thermally insulating layer; and
(f) means to view the developed image on said film through said case.

2. The camera of claim 1 wherein the means to forward and hold a supply of migration imaging film includes a removable film cassette providing a pair of spring loaded rollers to compress said film adjacent each side of said imaging station, said imaging station being viewable through said cassette.

3. The camera of claim 2 wherein said film cassette engages a reversible drive means whereby said film is forwarded.

4. The camera of claim 3 wherein said drive means includes an electrically driven reversible motor.

5. The camera of claim 1 wherein said means to electrostatically charge said film includes a corona discharge device situated along the path of travel of said film.

6. The camera of claim 1 wherein the support arm of the means to develop a latent image on said film is pivotally mounted above said path of travel of said film and is removably engagable with said film.

7. The camera of claim 6 wherein said platen is engagable by means of a reversible power source.

8. The camera of claim 7 wherein said power source includes a reversible electric motor having mounted therein a drive arm in camming relationship with said support arm for said substrate.

9. The camera of claim 1 wherein said heated surface includes a thermistor temperature sensing means associated with an electrical circuit to automatically control the temperature of said surface, said circuit including a precision reference voltage and a proportional control circuit whereby the voltage across said sensing means is compared and the result of said comparison utilized to control the voltage to said electrically heated surface.

10. The camera of claim 1 wherein said means to view said developed image includes a lens in said case focused on the imaging station and a light source adjacent said imaging station to illuminate said image from the side opposite said viewing lens.

11. A camera device comprising, in combination:
(a) a light-tight case;
(b) an electrical power supply located within said case;
(c) a lens and aperture means in said case to admit a controlled amount of light focused on an image plane within said case;
(d) means to forward and hold a supply of migration imaging film in said image plane;
(e) means to electrostatically charge said film surface supplied to said image plane;
(f) means to develop a latent image in said film by application of heat to said film, said means including a supporting substrate, a thermally insulating layer on said substrate, an electrically heated surface on said thermally insulating layer and a temperature sensing means associated with an electrical circuit to automatically control the temperature of said heated surface;
(g) a logic circuit means whereby said film forwarding means, electrostatic charging means, lens and aperture means, and latent image development means are operated automatically and in continuous stepwise sequence upon initiation of said sequence; and
(h) means to view the developed image on said film through said case.

12. The camera of claim 11 further including an electrical adapter means in said case whereby electrical power external to said case is provided to said power supply.

13. The camera of claim 11 further including a light flash unit on the exterior of said case and wherein said logic circuit automatically controls said flash unit.

14. The camera of claim 11 wherein said film is supplied in a cassette, said cassette providing a pair of spring loaded rollers to compress said film adjacent each side imaging station, said imaging station being viewable through said cassette.

15. The camera of claim 14 wherein said cassette engages a drive train associated with a reversible drive motor and said logic circuit controls said motor.

* * * * *